United States Patent [19]

Umemoto et al.

[11] Patent Number: 4,775,897
[45] Date of Patent: Oct. 4, 1988

[54] DUBBING METHOD AND APPARATUS FOR DIGITAL RECORDING REPRODUCING APPARATUS INCLUDING DIRECT DIGITAL OUTPUTS

[75] Inventors: Masuo Umemoto, Tokyo; Yoshizumi Eto, Sagamihara; Shinichi Miyazaki; Hidehiro Kanada, both of Kodaira; Hitoshi Katayama, Tokyo; Yuichi Michikawa, Katsuta, all of Japan

[73] Assignees: Hitachi, Ltd.; Hitachi Denshi Kabushiki Kaisha, both of Tokyo, Japan

[21] Appl. No.: 867,091

[22] Filed: May 27, 1986

[30] Foreign Application Priority Data

May 27, 1985 [JP] Japan .................................. 60-112017

[51] Int. Cl.$^4$ ............................................. H04N 9/80
[52] U.S. Cl. .................................. 358/311; 358/310; 358/327; 360/14.1; 360/32
[58] Field of Search ............................ 358/310–311, 358/314, 320–321, 327, 328, 339–340, 334; 360/14.1, 24, 32, 36.1, 36.2, 38.1, 53

[56] References Cited

U.S. PATENT DOCUMENTS

| | | | |
|---|---|---|---|
| 4,277,807 | 7/1981 | Baldwin | 360/32 |
| 4,329,708 | 5/1982 | Yamamoto et al. | 360/38.1 X |
| 4,396,953 | 8/1983 | Fujita et al. | 358/328 |
| 4,428,001 | 1/1984 | Yamamura et al. | 360/14.1 X |
| 4,446,489 | 5/1984 | Kojima et al. | |
| 4,580,173 | 4/1986 | Dischert et al. | 358/310 |

OTHER PUBLICATIONS

Hirano et al., "A study on Variable-Speed Reproduction of the Digital VTR", SMPTE Journal, Jun. 1983, pp. 636–641.
Toshiba Corporation, V-536 Video Cassette Recorder Owners' Manual, 1983.

Primary Examiner—Raymond F. Cardillo
Assistant Examiner—W. R. Young
Attorney, Agent, or Firm—Antonelli, Terry & Wands

[57] ABSTRACT

Disclosed is an apparatus in which a picture signal is converted into digital signals and the digital signals are recorded into a recording medium, and which is suitable to perform dubbing of the digital signals reproduced from the recording medium. The apparatus employs the component method in which a luminance signal and chrominance signals constituting a picture signal are recorded separately from each other. According to the component method, the sampling frequency of the chrominance signal is set to be about $\frac{1}{3}$–$\frac{1}{4}$ of that of the luminance signal, and therefore the recording/reproducing of a picture signal is carried out after the bit rate of the digital luminance signal is converted into a value equal to the bit rate of the digital chrominance signal. When digital dubbing is carried out between two apparatus each employing the component method, the taking-in and taking-out of signals to be dubbed are performed with respect to the digital luminance signals and digital chrominance signals having the same bit rate with each other.

13 Claims, 3 Drawing Sheets

| Y' | Y1 | Y2 | Y3 | Y4 | Y5 | Y6 | Y7 | Y8 | Y9 | Y10 | Y11 | Y12 | Y13 | Y14 | Y15 | Y16 | Y17 | Y18 | Y19 |
|---|---|---|---|---|---|---|---|---|---|---|---|---|---|---|---|---|---|---|---|

| $C'_W$ | Cw1 | Cw2 | Cw3 | Cw4 | Cw5 |
|---|---|---|---|---|---|

| $C'_N$ | Cn1 | Cn2 | Cn3 | Cn4 | Cn5 |
|---|---|---|---|---|---|

| $Y_I$ | Y1 | Y5 | Y9 | Y13 | Y17 |
|---|---|---|---|---|---|
| $Y_{II}$ | Y2 | Y6 | Y10 | Y14 | Y18 |
| $Y_{III}$ | Y3 | Y7 | Y11 | Y15 | Y19 |
| $Y_{IV}$ | Y4 | Y8 | Y12 | Y16 | Y20 |
| $C'_W$ | Cw1 | Cw2 | Cw3 | Cw4 | Cw5 |
| $C'_N$ | Cn1 | Cn2 | Cn3 | Cn4 | Cn5 |

| $C_1$ | Y1 | Cn2 | Cw3 | Y16 | Y19 |
|---|---|---|---|---|---|
| $C_2$ | Y2 | Y5 | Cn3 | Cw4 | Y20 |
| $C_3$ | Y3 | Y6 | Y9 | Cn4 | Cw5 |
| $C_4$ | Y4 | Y7 | Y10 | Y13 | Cn5 |
| $C_5$ | Cw1 | Y8 | Y11 | Y14 | Y17 |
| $C_6$ | Cn1 | Cw2 | Y12 | Y15 | Y18 |

DUBBING METHOD AND APPARATUS FOR DIGITAL RECORDING REPRODUCING APPARATUS INCLUDING DIRECT DIGITAL OUTPUTS

BACKGROUND OF THE INVENTION

1. Field of the Invention

The present invention generally relates to an apparatus in which an analog video signal is converted into a digital signal and the thus obtained digital signal is recorded in a recording medium by utilizing magnetism, light, or the like, and particularly relates to an apparatus in which digital dubbing of a reproduced signal in the above-mentioned apparatus is preferably carried out.

2. Description of the Prior Art

As such an apparatus in which an analog video signal is converted into a digital signal so as to be recorded in a recording medium by utilizing magnetism, light, or the like, for example, digital VTRs are widely used. Digital VTRs are featured in that it is possible to perform recording/reproducing with less deterioration in picture quality in comparison with conventional analog VTRs, and specifically, in that a signal-to noise ratio (S/N) is not lowered. That is, although the S/N is reduced at the rate of 20·log n [dB] when dubbing is carried out n times in the conventional analog VTR, such a reduction as effected in the conventional analog VTR is not generated in the digital VTR.

When a video signal is converted into a digital signal, for example, in the digital VTR, the thus obtained digital signal is a high speed data having a data rate of about 100 Mb/second or more, and therefore it is exceedingly difficult to record such a high speed data, for example, by using a single magnetic head. In order to cope with such a problem, used is a technique that the digital signal is distributed into a plurality of channels so as record the thus distributed signals simultaneously by using a plurality of magnetic heads.

In order to perform distribution of a digital video signal, the following methods are known as described, for example, in an article by Hirano et al., entitled "A study on Variable-Speed Reproduction of the Digital VTR", SMPTE Journal, Vol. 92, No. 6, June 1983 pp 636-641. In this method, a data of a video signal corresponding to every picture element is converted into a digital signal of n bits and the thus obtained digital signals are distributed into three channels A, B, and C in such a manner as follows (hereinafter, a digital signal of n bits corresponding to one picture element is referred to as "a picture element signal").

1. For every picture element signal, upper bits of digital signal, middle bits of digital signal, and lower bits of digital signal are distributed into channels A, B, and C respectively.

2. The digital signals are successively distributed for every picture element signal into A, B, C, A, B, C, ... , in order.

3. A picture element signal corresponding to a portion at the left side of a screen, a picture element signal corresponding to a portion at the center of the same, and a picture element signal corresponding to a portion at the right side of the same are distributed into channels A, B, and C respectively.

In the foregoing article, however, consideration is made mainly about the distribution for a signal, such as an NTSC signal, in which a luminance signal and a chrominance signal are combined by frequency division multiplex, that is, a so-called composite signal.

Further, the digital VTR has such a feature that dubbing can be carried out with less deterioration in picture quality, that is, with a high picture quality, and therefore the digital VTR is employed for use in studio, in business, etc. Moreover, the digital VTR is expected for use in a high definition television which requires a higher picture quality in comparison with the present television system (in the high definition television the number of scanning lines is selected to be about twice as many as that of the present television system so as to realize high definition). In order to perform recording with such a high picture quality as described above, it is more preferable to use a component method in which a luminance signal and a chrominance signal are processed separately from each other, than the use of the foregoing composite signal. According to the component method, three primary color signals (for example, an R signal, a G signal and a B signal) constituting a video signal are converted into a luminance signal Y and two kinds of chrominance signals I and Q (in the case of a high definition television, a luminance signal Y and chrominance signals $C_W$ and $C_N$), and recorded separately from each other. In this case, a sufficient visual quality can be obtained even if a signal band of the chrominance signals $C_W$ and $C_N$ is selected to be about $\frac{1}{2}$-$\frac{1}{4}$ times as much as that of the luminance signal Y.

However, there have been no reference in which reference is made to the optimization of distribution of digital signals in such a component method, and it is a matter of course that there have been no references in which reference is made to a method of performing digital dubbing of a reproduced signal in such a component method.

SUMMARY OF THE INVENTION

It is an object of the present invention to provide an apparatus in which a luminance signal and chrominance signals constituting a video signal are converted into digital signals separately from each other so as to be recorded in a plurality of channels and in which a digital signal reproduced in this apparatus is preferably dubbed into another apparatus.

It is another object of the present invention to provide an apparatus having a high reliability so that there hardly occur errors in digital signals when the digital signals are dubbed.

The present invention has been attained on the basis the component method (which has been proposed in U.S. Ser. No. 758,702, U.S. Pat. No. 4,737,863 in which a luminance signal and chrominance signals constituting a video signal are converted into digital signals separately from each other.

In this component method, the digital luminance signal is converted into several low speed luminance signals which have the equal bit rate of the digital chrominance signals. The several low speed luminance digital signal and the chrominance digital signals are mixed cyclically and are recorded in the proper multichannels. As a result, even in the case where errors such as a drop-out or the like are concentratedly generated in a specific of the channels, the influence of hhose errors on the whole picture signal is made as small as possible.

The present invention has paid attention onto this point, that is, onto the fact that when digital signals are dubbed according to the component method, the digital signals to be dubbed are taken out of portions where the digital luminance signal and the digital chrominance signals are of the same bit rate.

According to the present invention, since all the digital signals to be dubbed have a bit rate equal to that of the digital chrominance signals after digital conversion, less errors occurs in dubbing in comparison with the case where dubbing is performed with the digital luminance signal having a high bit rate as it is, so that the reliability in data transmission can be improved. Further, because of the increase in reliability, it is possible to use more inexpensive connection lines than those used in the case where dubbing is performed with the digital luminance signal having a high bit rate as it is.

The present invention will be apparent from the following detailed description taken in conjunction with the accompanying drawings.

BRIEF DESCRIPTION OF THE DRAWINGS

FIG. 2(A,B,C) shows the respective signals from the parts of FIG. 1.

DETAILED DESCRIPTION OF THE PREFERRED EMBODIMENTS

Figure 1A:
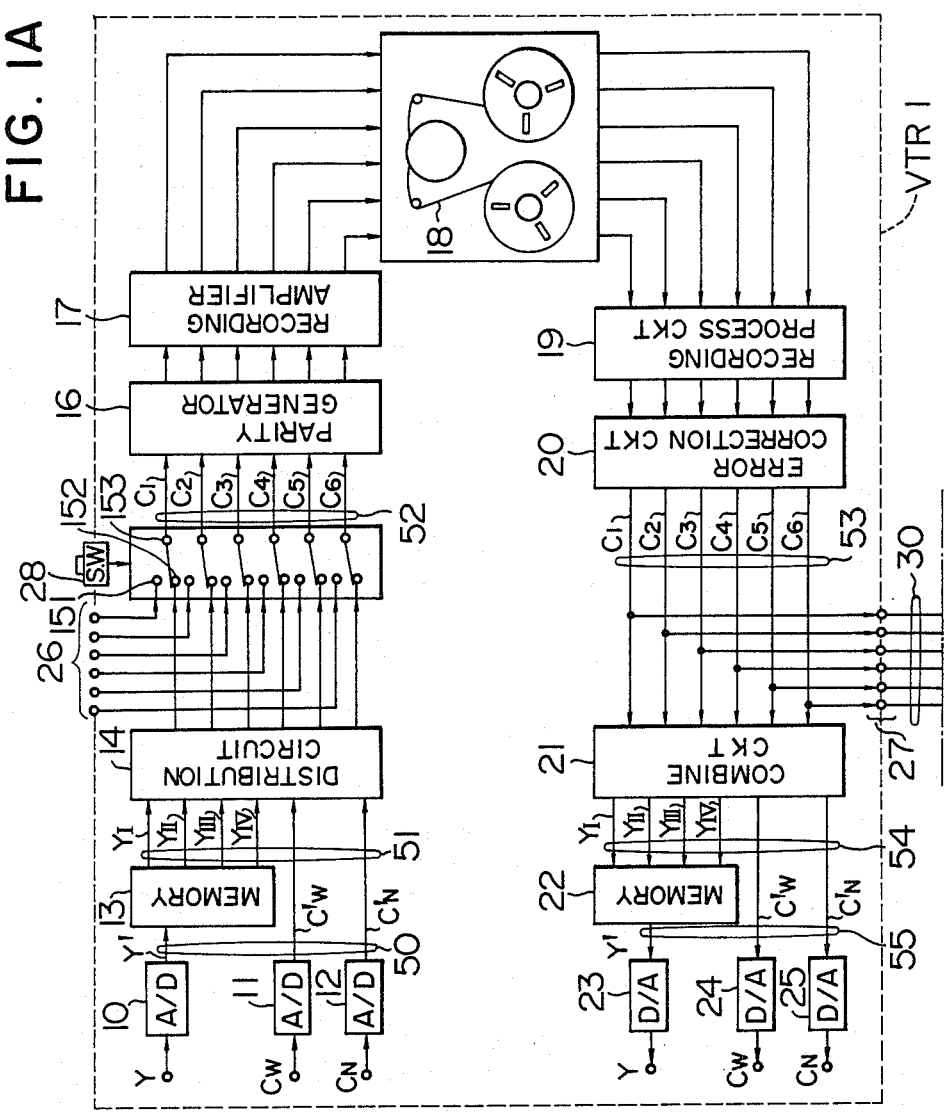
FIG. 1(A,B) is a block diagram showing an embodiment according to the present invention.
Figure 1B:
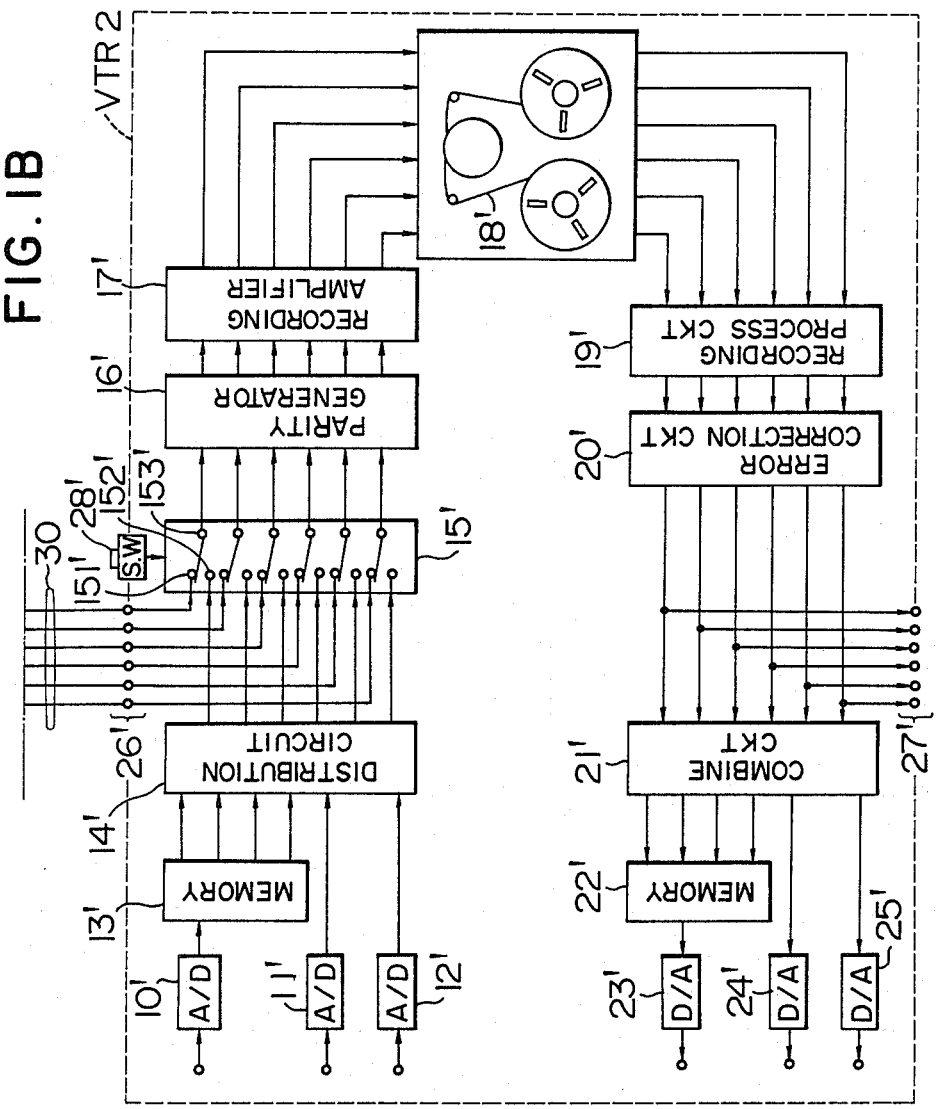

FIG. 1 shows an embodiment for enabling dubbing according to the present invention wherein FIG. 1A and FIG. 1B are block diagrams showing system portions of the present invention.

In the drawing, now, assume that a digital dubbing operation is carried out from a VTR 1 to a VTR 2, which are connected to each other through connection lines 30 for dubbing.

The arrangement and operations of the VTRs will be described prior to the description as to the dubbing operations.

In the VTR 1, a luminance signal Y constituting an analog video signal is converted into a digital luminance signal Y' by an analog-to-digital (A/D) converter 10. The thus obtained a high bit rate digital luminance signal Y' is converted in a memory 13 into digital luminance signals $Y_I$, $Y_{II}$, $Y_{III}$ and $Y_{IV}$ of the same bit rate as that of the digital chrominance signals $C'_W$ and $C'_N$. In this embodiment, in order to lower the bit rate of the digital luminance signal Y' to a value of ¼ times as much as the original bit rate, the digital luminance signal Y' is converted into the four digital luminance signals $Y_I$, $Y_{II}$, $Y_{III}$, and $Y_{IV}$. Further chrominance signals $C_W$ and $C_N$ constituting the video signal to be recorded are converted into the digital chrominance signals $C'_W$ and $C'_N$ by A/D converters 11 and 12 respectively, and the signals $Y_I$, $Y_{II}$, $Y_{III}$, and $Y_{IV}$ read out of the memory 13 and the respective signals $C'_W$ and $C'_N$ produced from the A/D converters 11 and 12 are distributed into a plurality of digital signals (six digital signals in th illustrated embodiment) in which the digital luminance signals and the digital chrominance signals are mixed cyclically by a distribution circuit 14. The operation of this distribution circuit 14 will be described later in detail with reference to FIG. 2. A switching circuit 15 is constituted by six change-over switches each of which is constituted by two fixed contacts 151 and 152 and a movable contact 153. One fixed contact 152 is connected to the distribution circuit 14 while the other fixed contact 151 is connected to corresponding one of input terminals 26. The movable contact 153 of the respective change-over switch is caused to contact with selected one of the contacts 151 and 152 so as to transfer the signal applied to the selected one of the fixed contacts 151 and 152 to a parity generator 16. The change-over operation of the movable contact between the fixed contacts 151 and 152 is performed by a switch 28. The parity generator 16 adds an error correction code to the signals $C_1$, $C_2$, $C_3$, $C_4$, $C_5$, and $C_6$ transferred from the switching circuit 15. The signals to which the error correction code has been added are written into a recording medium 18 through a recording amplifier 17. Thus, the video signal is recorded in the recording medium 18.

The recorded video signal is processed in such a manner as follows so as to reproduce the original luminance signal Y and the chrominance signals $C_W$ and $C_N$. A reproducing process circuit 19 is constituted by a pre-amplifier and an equalizing circuit, and compensates deterioration in signals reproduced from the recording medium 18. An error correction circuit 29 corrects code errors in signals reproduced by the reproducing process circuit 19. The signals which have been subjected to error correction by the error correction circuit 20 are led respectively to output terminals 27 for dubbing. The plurality of digital signals in which the digital luminance signals and the digital chrominance signals have been distributed are combined by a combine circuit 21 into the original digital luminance signals $Y_I$, $Y_{II}$, $Y_{III}$, and $Y_{IV}$ and the original digital chrominance signals C, and $C_N$. The digital luminance signals $Y_I$, $Y_{II}$, $Y_{III}$, and $Y_{IV}$ each having a lowered bit rate are converted in a memory 22 into the original high speed digital luminance signal Y'. The digital luminance signal Y' read out of from the memory 22, and the digital chrominance signals $C'_W$ and $C'_N$ produced from the combined circuit 2 are converted into the analog signals by digital-to-analog converters 23, 24, and 25 respectively, thereby reproducing the original luminance signal Y and the original chrominance signals $C_W$ and $C_N$. In the illustrated embodiment, the arrangement of parts of the VTR 2 shown by the reference numerals 10' through 27' are the same as those of the foregoing parts of the VTR 1, and therefore the explanation about them is omitted.

FIGS. 2A, 2B, and 2C show the signals produced from the parts of FIG. 1 respectively, in which: FIG. 2A shows the signals at the input side 50 of the memory 13 and the distribution circuit 14 as well as the signals at the output side 55 of the memory 22 and the combine circuit 21; FIG. 2B shows the signals at the input side 51 of the distribution circuit 14 as well as the signals at the output side 54 of the combine circuit 21; and FIG. 2C shows the signals at the input side 52 of the parity generator 16 as well as the signals at the output side 53 of the error correction circuit 20.

The high bit rate luminance signal Y' as shown in FIG. 2A is converted in the memory 13 into the digital luminance signals $Y_I$, $Y_{II}$, $Y_{III}$, and $Y_{IV}$ of the same bit rate as the digital chrominance signals $C'_W$ and $C'_N$, as shown in FIG. 2B. The reason why the digital chrominance signals $C_W$, and $C_N$, have a bit rate lower than that of the digital luminance signal Y' as shown in FIG. 2A is that a sufficient visual quality can be obtained even when a signal band of a chrominance signal is selected to be about ¼ times as much as that of a luminance signal. Further, the reason why the bit rate of the digital luminance signals is made to be equal to that of the digital chrominance signals is that the digital luminance signals and the digital chrominance signals are distributed in the matched state. As shown in FIG. 2C, the distribution circuit 14 distributes the digital luminance signals $Y_1$, $Y_2$, $Y_3$ ..., and the digital chrominance signals $C_{W1}$, $C_{W2}$, $C_{W3}$ ..., $C_{N1}$, $C_{N2}$, $C_{N3}$ ... into six digital signals $C_1$-$C_6$ in which the digital luminance signals $Y_1$, $Y_2$, $Y_3$... and the digital chrominance signals $C_{W1}$, $C_{W2}$, $C_{W3}$, $C_{N1}$, $C_{N2}$, $C_{N3}$ ... are mixed cyclically. This is because when a drop-out has been generated in a signal in a certain channel, deterioration of the signals is concentrated on the signal in the specific channel, for example, the digital chrominance signal $C'_W$ if the signals stay in the state as shown in FIG. 2A or 2B, so that a picture quality is deteriorated. Consequently, even in the case where a drop-out has been generated in a signal in a certain channel, the deterioration of the signals is hardly concentrated on the signal in the specific channel, if the digital signals are distributed so as to be mixed cyclically as shown in FIG. 2C. Therefore, the deterioration of the signals is equally divided with respect to a plurality of signals, so that it is possible to make less the deterioration in picture quality. The thus obtained digital signals are recorded in the recording medium 18 through the parity generator 16 and the recording amplifier 17. A procedure for reproducing the original video signal from the digital signal recorded in the recording medium 18 is effected by reversely executing the foregoing recording procedure. That is, the digital signals reproduced from the recording medium 18 are taken into the combine circuit 21 through the reproducing process circuit 19 and the error correction circuit 20. By the combine circuit 21, the signals as shown in FIG. 2C are rearranged and combined into the digital luminance signals $Y_I$-$Y_{IV}$ and the digital chrominance signals $C'_W$ and $C'_N$ as shown in FIG. 2B. The digital luminance signals $Y_I$-$Y_{IV}$ are converted in the memory 22 into a high bit rate signal so as to obtain the original digital luminance signal Y'. Thus, the digital signals, that is, the digital luminance signal and the digital chrominance signals are reproduced separately from each other.

Next, the operation of performing digital dubbing from the VTR 1 to the VTR 2 will be described. Now, assume that the dubbing is effected from the VTR 1 to the VTR 2 by using a tape in the VTR 1 as a source tape. In this case, change-over switches constituting a switching circuit 15' are connected to output terminals 26' for dubbing in response to a change-over signal applied to a switch 28'. The digital luminance signals and the digital chrominance signals distributed as shown in FIG. 2C are applied to these input terminals 26' through the dubbing signal output terminal 27 and the connection lines 30, respectively. In the VTR 2, the signals to be dubbed are recorded according to a procedure the same as the foregoing procedure for the recording operation in the VTR 1. Since the signal to be dubbed has the most smallest bit rate of all the digital signals processed in this digital VTR, there hardly occurs such a problem as generation of a code error or the like in data transmission when this VTR is connected to another digital VTR.

Next, specific numerical values of the bit rate will be described. The luminance signal Y has a signal band of 20 MHz, and the sampling frequency for the luminance signal Y is made to be twice or more as much as the signal band, that is, to be 45.9 MHz. The signal band of the chrominance signals $C_W$ and $C_N$ is 5-7 MHz. In connection with the sampling frequency for the luminance signal, the sampling frequency for the chrominance signals $C_W$ and $C_N$ is selected to be $\frac{1}{4}$ times as much as the former, that is, to be 11.5 MHz. The bit rate of the digital luminance signal Y is converted in the memory 13 into a value $\frac{1}{4}$ times as much as the original value thereof, so that the bit rate of the digital luminance signals $Y_I$, $Y_{II}$, $Y_{III}$, and $Y_{IV}$ after conversion is equal to that of the digital chrominance signals $C_W$, and $C_N$. Therefore, a word bit rate is 11.5 M word/second. Signal processing in the parity generator 16 and the error correction circuit 20 is carried out at this low bit rate, and the signals to be dubbed are transferred also at this low bit rate.

Further, signals to be dubbed may be taken out of the output side 54 of the combine circuit 21 and applied to the input side 51 of the distribution circuit 14 because the input side 51 of the distribution circuit 14 corresponds to the output side 54 of the combine circuit 21 as seen from FIG. 2A. In this case, the digital luminance signals $Y_I$, $Y_{II}$, $Y_{III}$, and $Y_{IV}$ and the digital chrominance signals $C_W$, and $C_N$, are not distributed to be mixed cyclically for every channel, and therefore there occurs such a problem of that a drop-out is generated in a specific channel and the signal in the channel is concentratedly deteriorated. Therefore, it is needless to say that the embodiment of FIG. 1 is the most preferable.

What is claimed is:

1. A dubbing method for digital recording reproducing apparatus comprising:
   a first step of converting a luminance signal and a plurality of chrominance signals constituting a video signal into a digital luminance signal and a plurality of digital chrominance signals respectively;
   a second step of converting said digital luminance signal into a plurality of digital luminance signals of the same bit rate as said digital chrominance signals;
   a third step of distributing said plurality of digital luminance signals and said plurality of digital chrominance signals into a plurality of digital signals in which said plurality of digital luminance signals and said plurality of digital chrominance signals are mixed cyclically;
   a fourth step of recording said mixed digital signals;
   a fifth step of reproducing said mixed digital signals from said recorded digital signals;
   a sixth step of combining said mixed digital signals reproduced by said fifth step into signals corresponding to said plurality of digital luminance and said plurality of digital chrominance signals before being distributed by said third step; and
   a seventh step of outputting said signals corresponding to said plurality of digital luminance signals and said plurality of digital chrominance signals as signals for use in dubbing operations.

2. A dubbing method for a digital recording reproducing apparatus comprising:
   a first step of converting a luminance signal and a plurality of chrominance signals constituting a video signal into a digital luminance signal and a plurality of digital chrominance signals respectively;
   a second step of converting said digital luminance signal into a plurality of digital luminance signals of the same bit rate as said digital chrominance signals;
   a third step of distributing said plurality of digital luminance signals and said plurality of digital chrominance signals into a plurality of digital signals in which said plurality of digital luminance signals and said plurality of digital chrominance signals are mixed cyclically;

a fourth step of recording said mixed digital signals;

a fifth step of reproducing said mixed digital signals from said recorded digital signals;

a sixth step of outputting said mixed digital signals reproduced by said fifth step as signals for use in dubbing operations.

3. A digital recording apparatus comprising:

a plurality of first converter means for converting a luminance signal and a plurality of chrominance signals constituting a video signal into a digital luminance signal and a plurality of digital chrominance signals respectively;

second conve means for converting said digital luminance signal in to a plurality of digital luminance signals of the same bit rate as said digital chrominance signals;

recording means for recording said plurality of digital luminance from said second converter means and said plurality of digital chrominance signals;

third converter means for converting said plurality of digital luminance signals reproduced from said recording means into a digital luminance signal of the same bit rate as said luminance signal before being converted by said second converter means;

fourth converter means for converting said digital luminance from said third converter means and said plurality of of digital luminance signals and said plurality of digital chrominance signals into an analog luminance signal, a plurality of luminance signals and a plurality of analog chrominance signals respectively; and output means for outputting the digital luminance and chrominance signals between said recording means and said third converter means as signals for use in dubbing operations.

4. A digital recording apparatus comprising:

a plurality of first converter means for converting a luminance signal and a plurality of chrominance signals constituting a video signal into a digital luminance signal and a plurality of digital chrominance signals respectively;

second converter means for converting said digital luminance signal in to a plurality of digital luminance signals of the same bit rate as said digital chrominance signals;

distributor means for distributing said plurality of digital luminance signals from said second converter means and said plurality of digital chrominance signals into a plurality of digital signals in which said plurality of digital luminance signals and said plurality of digital chrominance signals are mixed cyclically;

recording means for recording said plurality of digital signals distributed by said distributor means;

combine means for combining said plurality of digital signals reproduced from said recording means into signals corresponding to said plurality of digital luminance signals and said plurality of digital chrominance signals before being distributed by said distributor means;

third converter means for converting said plurality of digital luminance signals reproduced from said combine means into a digital luminance signal of the same bit rate as said luminance signal before being converted by said second converter means;

fourth converter means for converting said digital luminance and chrominance signals from said third converter means and said combine means into analog luminance and chrominance signals respectively; and output means for outputting the digital luminance signals and digital chrominance signals between said recording means and said third converter means as signals for use in dubbing operations.

5. A digital recording apparatus according to claim 4, in which said output means produces the signals the same as input signals of said combine means as signals for use in dubbing operations.

6. A digital recording apparatus according to claim 4, in which said output means produces the same digital luminance and chrominance signals as output signals of said combine means as signals for use in dubbing operations.

7. A digital recording apparatus according to claim 4, further comprising:

parity generator means provided between said distributor means and said recording means for adding an error correction code to said digital signals from said distributor means; and correction means provided between said recording means and said combine means for correcting errors in said digital signals from said recording means on the basis of said error correction code included in said digital signals from said recording means.

8. A digital recording apparatus comprising:

a plurality of first converter means for converting a luminance signal and a plurality of chrominance signals constituting a video signal into a digital luminance signal and a plurality of digital chrominance signals respectively;

second converter means for converting said digital luminance signal into a plurality of digital luminance signals of the same bit rate as said digital chrominance signals;

distributor means for distributing said plurality of digital luminance signals from said second converter means and said plurality of digital chrominance signals into a plurality of digital signals in which said plurality of digital luminance signals and said plurality of digital chrominance signals are mixed cyclically;

recording means for recording said plurality of digital signals distributed by said distributor means;

combine means for combining said plurality of digital signals reproduced from said recording means into signals corresponding to said plurality of digital luminance signals and said plurality of digital chrominance signals before being distributed by said distributor means;

third converter means for converting said plurality of digital luminance signals reproduced from said combine means into a digital luminance signal of the same bit rate as said luminance signal before being converted by said second converter means;

fourth converter means for converting said digital luminance and chrominance signals from said third converter means and said combine means into analog luminance and chrominance signals respectively;

means for receiving digital signals for use in dubbing operations; and switching means provided between said second converter means and said recording means for switching between said digital signals for use in dubbing operations and said digital signals from said first converter means.

9. A digital recording apparatus according to claim 8, in which said switching means is provided at the output side of said distributor means.

10. A digital recording apparatus according to claim 8, in which said switching means is provided at the input side of said distributor means.

11. A digital recording apparatus comprising:
a plurality of first converter means for converting a luminance signal and a plurality of chrominance signals constituting a video signal into a digital luminance signal and a plurality of digital chrominance signals respectively;

second converter means for converting said digital luminance signal into a plurality of digital luminance signals of the same bit rate as said digital chrominance signals;

distributor means for distributing said plurality of digital luminance signals from said second converter means and said plurality of digital chrominance signals into a plurality of digital signals in which said plurality of digital luminance signals and said plurality of digital chrominance signals are mixed cyclically;

recording means for recording said plurality of digital signals distributed by said distributor means;

combine means for combining said plurality of digital signals reproduced from said recording means into signals corresponding to said plurality of digital luminance signals and said plurality of digital chrominance signals before being distributed by said distributor means;

third converter means for converting said plurality of digital luminance signals reproduced from said combine means into a digital luminance signal of the same bit rate as said luminance signal before being converted by said second converter means;

fourth converter means for converting said digital luminance and chrominance signals from said third converter means and said combine means into analog luminance and chrominance signals respectively;

output means for producing the digital luminance signals and digital chrominance signals between said recording means and said third converter means as signals for use in dubbing operations;

means for receiving digital signals for use in dubbing operations; and switching means provided between said second converter means and said recording means for switching between said digital signals for use in dubbing operations and said digital signals from said first converter means.

12. A digital recording apparatus according to claim 11, in which said switching means is provided at the output side of said distributor means, and in which said output means produces the signals the same as input signals of said combine means a signals for use in dubbing operations.

13. A digital recording apparatus according to claim 11, in which said switching means is provided at the input side of said distributor means, and in which said output means produces the same digital luminance and chrominance signals as output signals of said combine means as signals for use in dubbing operations.

* * * * *